Dec. 13, 1927.
M. MUNZNER
1,652,631
ADJUSTABLE FRAME OR TRUSS FOR INSTRUMENTS OF PRECISION
Filed April 12, 1923
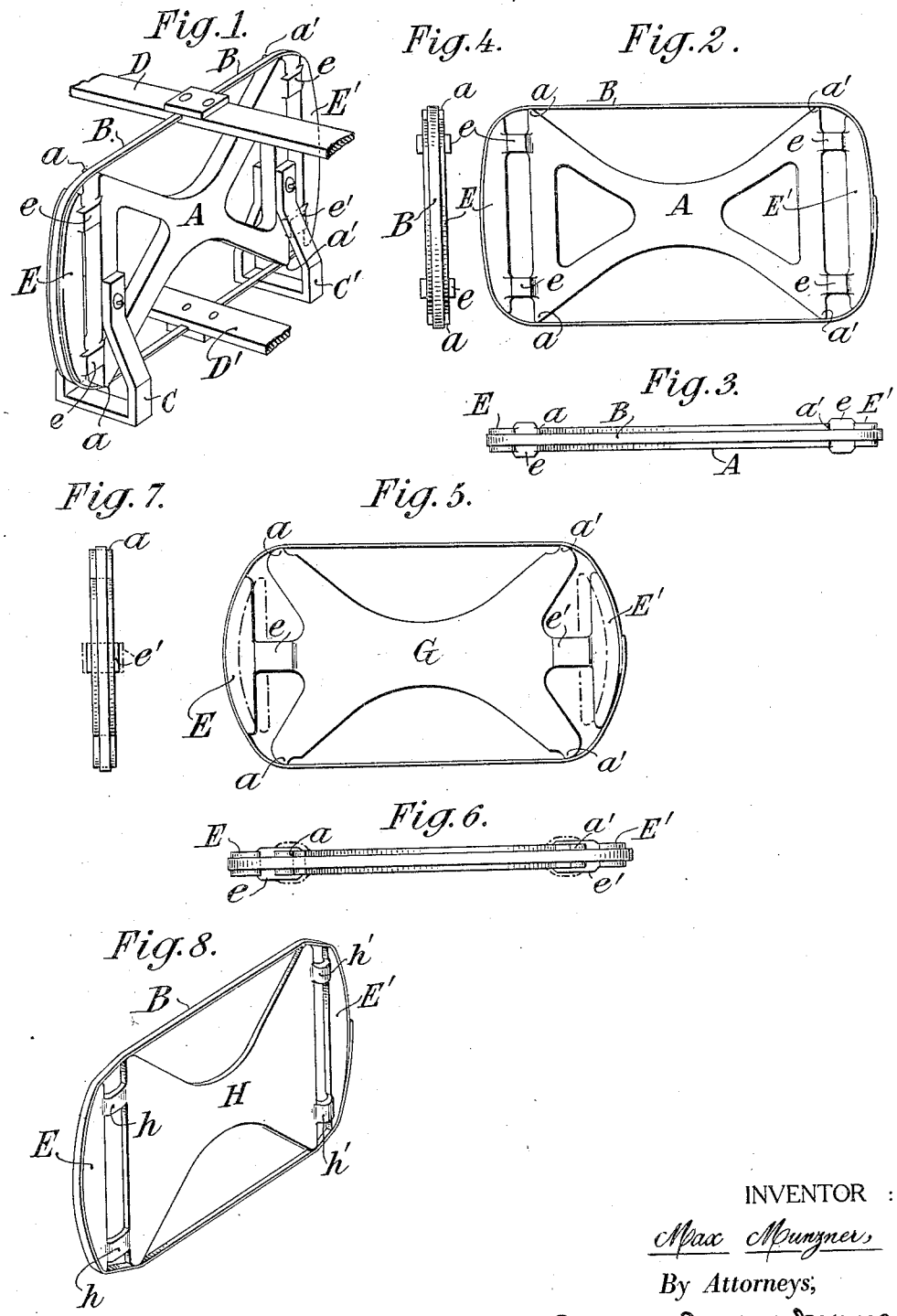
INVENTOR:
Max Munzner
By Attorneys;
Fraser, Durk & Myers Patented Dec. 13, 1927.

1,652,631

UNITED STATES PATENT OFFICE.

MAX MUNZNER, OF JERSEY CITY, NEW JERSEY, ASSIGNOR TO THE TORSION BALANCE COMPANY, OF NEW YORK, N. Y., A CORPORATION OF NEW YORK.

ADJUSTABLE FRAME OR TRUSS FOR INSTRUMENTS OF PRECISION.

Application filed April 12, 1923. Serial No. 631,624.

This invention relates to a frame or truss for the weighing means of scales or balances having certain relatively fixed points. A frame or truss of this kind is commonly used as the spreader for the torsion wire or band of a torsion balance scale such as is shown in my U. S. Patent No. 1,121,861, or it may be the truss of a balance supported on knife edges. The invention is also applicable to a wide range of instruments of precision other than weighing apparatus, for example, gauges and many forms of measuring instruments. In fact, it may be employed to advantage in almost any such instrument wherein it is desired to effect a permanent and nice adjustment of a dependent part with respect to a supporting part which has fixed points that should never be disturbed.

In machines where precision of adjustment is of the highest importance, and where such adjustment once made is not ordinarily to be changed, the use of screw controlled movements is often undesirable because of the likelihood of such adjustment being subject to derangement through accident or tampering of the unskilled layman.

It has been the practice in setting up the usual endless elastic torsion band on its spreader frame or truss in torsion balance scales to effect the proper tensioning of such band by expanding the frame within it under the peening action of a hammer, the frame being made of some malleable material. This method has effected the desired tensioning of the band, and provides an adjustment which is unquestionably permanent, but it has the great disadvantage of inevitably distorting the frame with risk of throwing out of alignment certain fixed points thereon, the precise location of which absolutely determines the accuracy of the scale.

The present invention provides in a frame of the above nature an improved adjustment that entirely eliminates the disadvantage referred to. The adjustment is more easily effected, is permanent, and can in no way distort the frame to alter the position of the fixed points.

For the sake of simplicity the invention will be described with particular reference to its use in torsion balance scales, the adjustable frame or truss being employed in this connection to great advantage. Its application to other devices wherein a similar problem is encountered will be obvious. In the following description the word "frame" is to be understood in its broadest sense. It may refer to a truss construction or to a simple plate and will include any supporting structure.

In torsion balance scales the endless fulcrum bands or wires which take the place of knife edge bearings are commonly drawn taut over a spreader frame. The tensioning of these bands is a nice adjustment which, once made, should be permanent. In the process of tensioning these bands the alignment of the bearing points on the frame, between which the active portions of the bands lie, should not under any circumstances be disturbed, as the slightest error in parallelism between the upper and lower active torsion elements will interfere with the operation of the balance and render it less accurate.

To accomplish this result the present invention provides a frame having accurately located fixed bearing points on its main body, and a dependent member connected with said main body by deformable links which, upon being stressed, are permanently changed in shape to effect a movement of the dependent member with respect to said main body. The links may be integral with the frame body and dependent member, or they may be formed separately from either or both, it being necessary only that they afford a deformable connection between the two. The word "link" as herein used is to be understood as meaning a rigidly mounted bridge or connecting piece and it is not intended thereby to convey the idea of an articulated member.

The deformable connections or links will be variously shaped according to the demands made upon them in various adaptations of the invention. The design in each case will be controlled by consideration of the load sustained by the links, to and fro movement necessary for maximum adjustment, and nature of the stress to be employed in deforming the links. It is apparent that deformation of the links may be effected by pressure, hammer blows, or tension.

In the accompanying drawings,—

Figure 1 is a fragmentary perspective view, showing the invention as applied to the central spreader frame of a torsion balance scale.

Figs. 2, 3 and 4 are respectively elevation, plan, and profile views of the spreader frame shown in Fig. 1.

Figs. 5, 6 and 7 are respectively elevation, plan, and profile views of a modification of the spreader frame.

Fig. 8 is a perspective view of a different type spreader frame with a modification of deformable adjusting links.

Referring to the drawings, Figs. 1, 2, 3, and 4, show the central spreader frame of a torsion balance scale. The object of this spreader frame A is to support under tension a continuous torsion band B which takes the place of the central pivots in the ordinary knife-edge bearing balances. The frame is mounted upon the base of the scale in any suitable manner as by the supports C C'. The upper and lower parallel balance beams D D' are mounted upon the active portions of such band stretched between the two pairs of bearing points $a$, $a'$. These torsionally active band sections constituting the independent pivotal axes of the cooperating balance beams must necessarily be parallel if a sensitive scale is required. It is therefore apparent that the accurate positioning of the bearing points is important, and a further adjustment of the frame subsequent to their location must not in any way change their relationship.

Formerly it was the practice to tension the band B by peening the central portion of the frame itself. Under continued hammering the frame would be sufficiently expanded to make the band surrounding it taut, but with the inevitable accompanying result of distorting the frame and thereby displacing the band bearing points upon it. According to the present invention an adjustment of the spreader frame which will permit it to be permanently expanded, to finally tension the torsion band stretched around it, without in any way disturbing the location of the fixed bearing points, is secured in the following manner:

At each end of the frame A there is provided a dependent member E, adjustably connected to said frame by deformable or malleable links $e$. The band B is permanently tensioned by the outward movements of members E, E' when the connecting links are deformed under mechanical pressure. The links may be deformed by peening with a hammer, or by the squeezing action of a press. It will be observed, however, that the deformation of the links under pressure while producing the desired movement of dependent members E, E', does not disturb the location of the bearing points $a$, $a'$ on the frame.

Because of placing the supporting links near each end of dependent member E, not only its general outward movement may be controlled, but by independent straining of the links adjustment in alignment may also be effected.

A modified form of frame is shown in Figs. 5, 6 and 7. In this frame G only single deformable links $e$, $e'$ are used to support the dependent members E, E', but the links are disposed in such a manner that deformation will be confined to them when the frame is being adjusted and in no way will the relative location of the fixed bearing points $a$, $a'$ be disturbed. The figures indicate in dotted lines the original shape of the deformable link $e'$ before it is permanently deformed.

The second modified form of spreader frame illustrated in Fig. 8, is especially suited for light duty. Because of the deformable links $h$, $h'$ being of uniform thickness with the frame H and dependent member E, the entire frame or spreader may be punched from sheet material in a single operation, the links $h$, $h'$ being stamped at the same time into deformable arches, as shown in the drawing. The links $h'$ are shown in their original shape while the links $h$ have been deformed under pressure to partially tension the band. In this type of frame the arched links are extensible under pressure or hammer blows, which permanently deform them in the same manner as the solid links of the frames previously described. In either case the adjusting force is applied to the link at right angles to the movement which it is desired to effect between the main and dependent members, and the force thus applied produces a fixed deformation or strain in such link whereby a permanent adjustment of the frame is secured. In either case strain is confined to the link, there being no deformation of the frame members whatever.

While certain embodiments of this invention have been described and illustrated, the invention is not to be understood as limited thereto, as various modifications and changes may be made therein without departing from the spirit of the invention as defined in the following claims.

What I claim is:

1. An adjustable frame for an instrument of precision, comprising rigidly-connected members, one of said members having bearing points of fixed relation, with extensible connecting means between said members comprising a solid deformable link thicker than said members and adapted on being flattened to extend the link and increase the spacing of the frame members without altering the shape of said members.

2. An adjustable frame for an instrument of precision, comprising a member carrying a plurality of bearing points of normally fixed relation, and a member adjustable with respect thereto, with extensible connecting means between said members comprising solid deformable links thicker than said members and adapted on being flattened to extend the links and increase the spacing of the frame members without altering the shape of said members.

3. An adjustable frame for torsion balance scales comprising a torsion band supporting member having fixed bearing points between which the active portions of the torsion band lie, a torsion band tensioning member, and adjustable connecting means between said members comprising a deformable link whereby upon deformation of the link the tensioning member will be moved without altering the relative positions of the bearing points on the supporting member.

4. An adjustable frame for torsion balance scales comprising a torsion band supporting member, a torsion band tensioning member and deformable links connecting said members, said links being disposed with their direction of adjustment parallel to the line of support of the active portion of the torsion band.

In witness whereof, I have hereunto signed my name.

MAX MUNZNER.